F. W. LAKE.
AEROPLANE.
APPLICATION FILED MAR. 19, 1917.
1,260,917.
Patented Mar. 26, 1918.
6 SHEETS—SHEET 1.
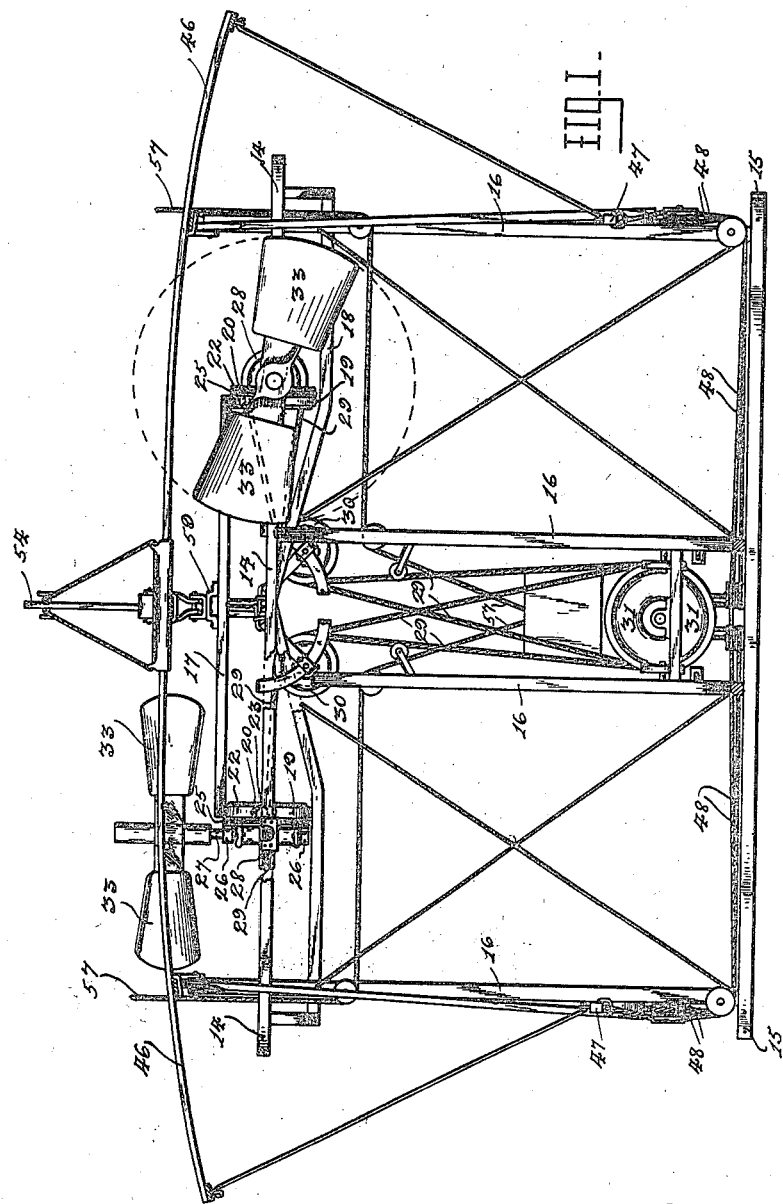
Witnesses
Inventor
Franklin W. Lake.
By
Atty.

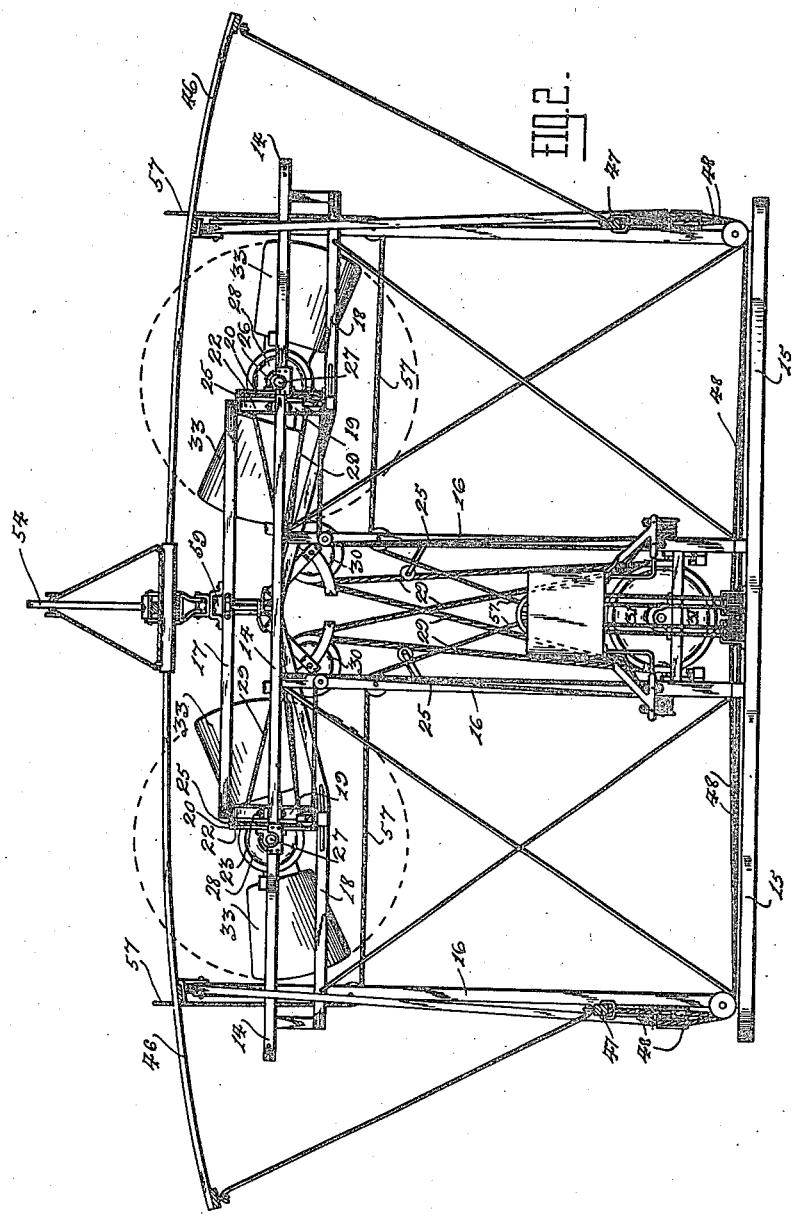

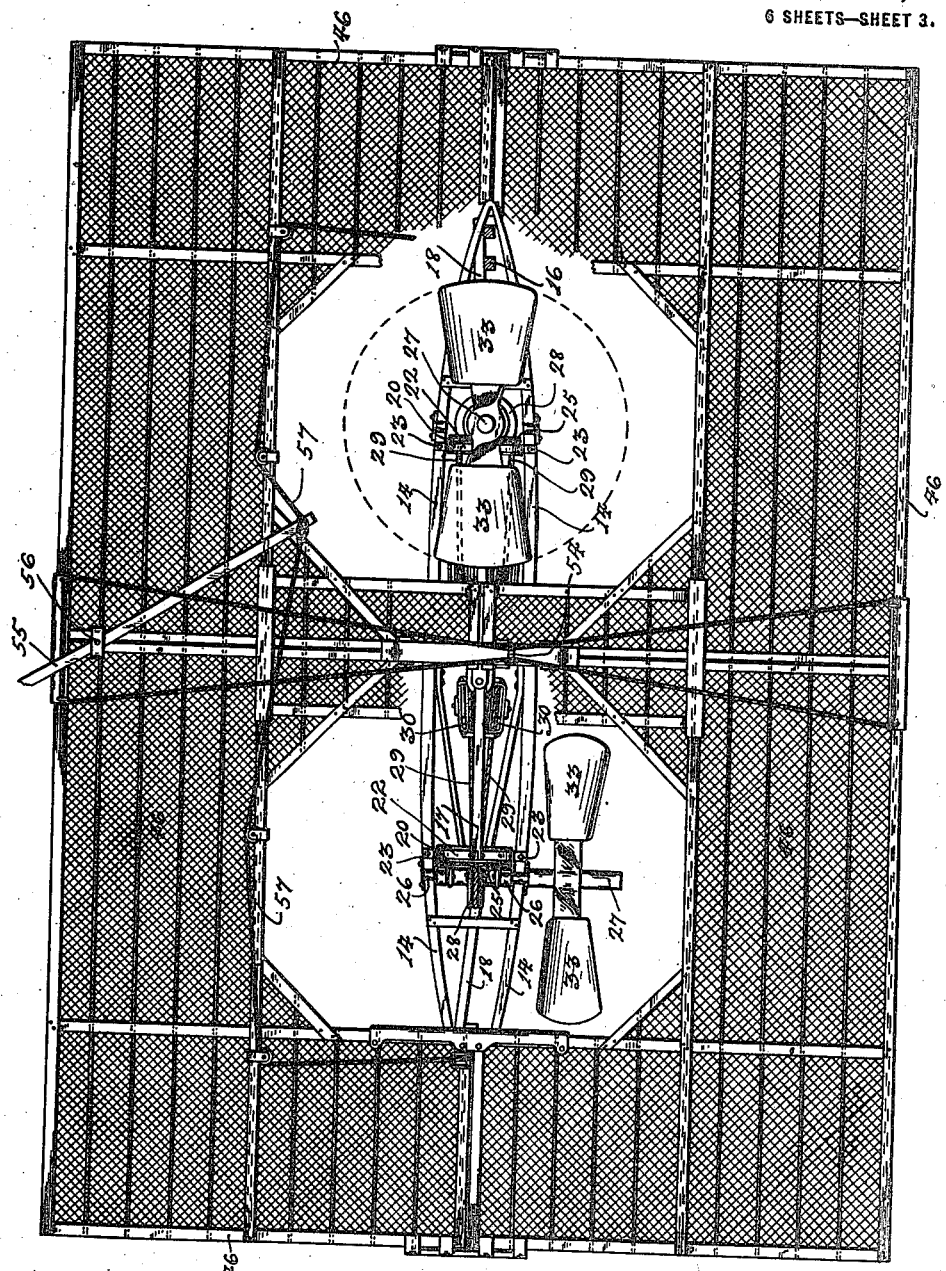

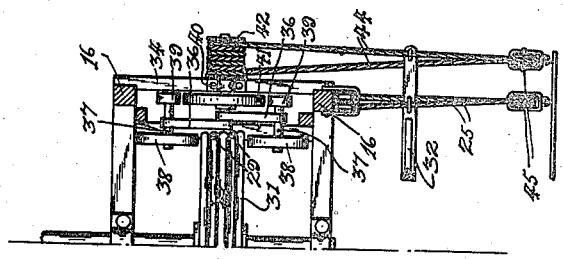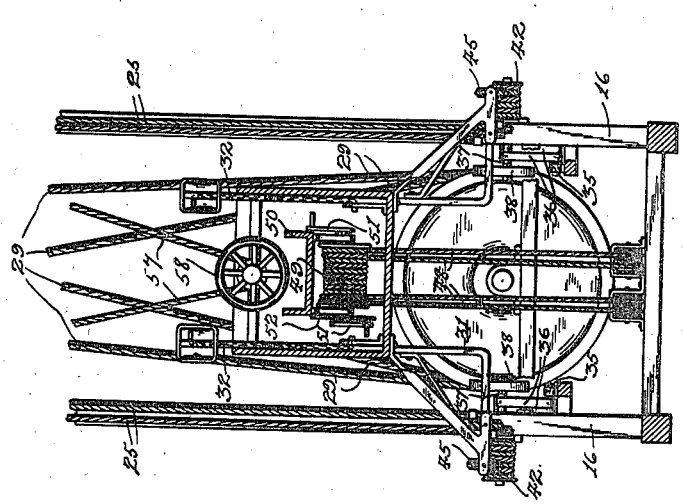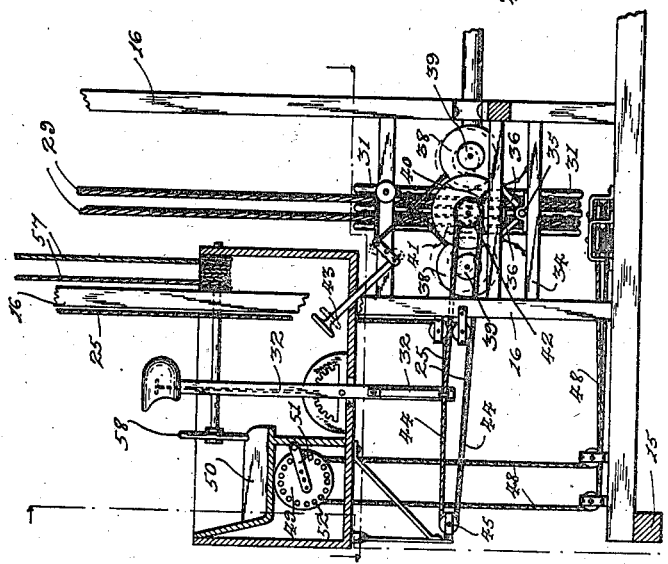

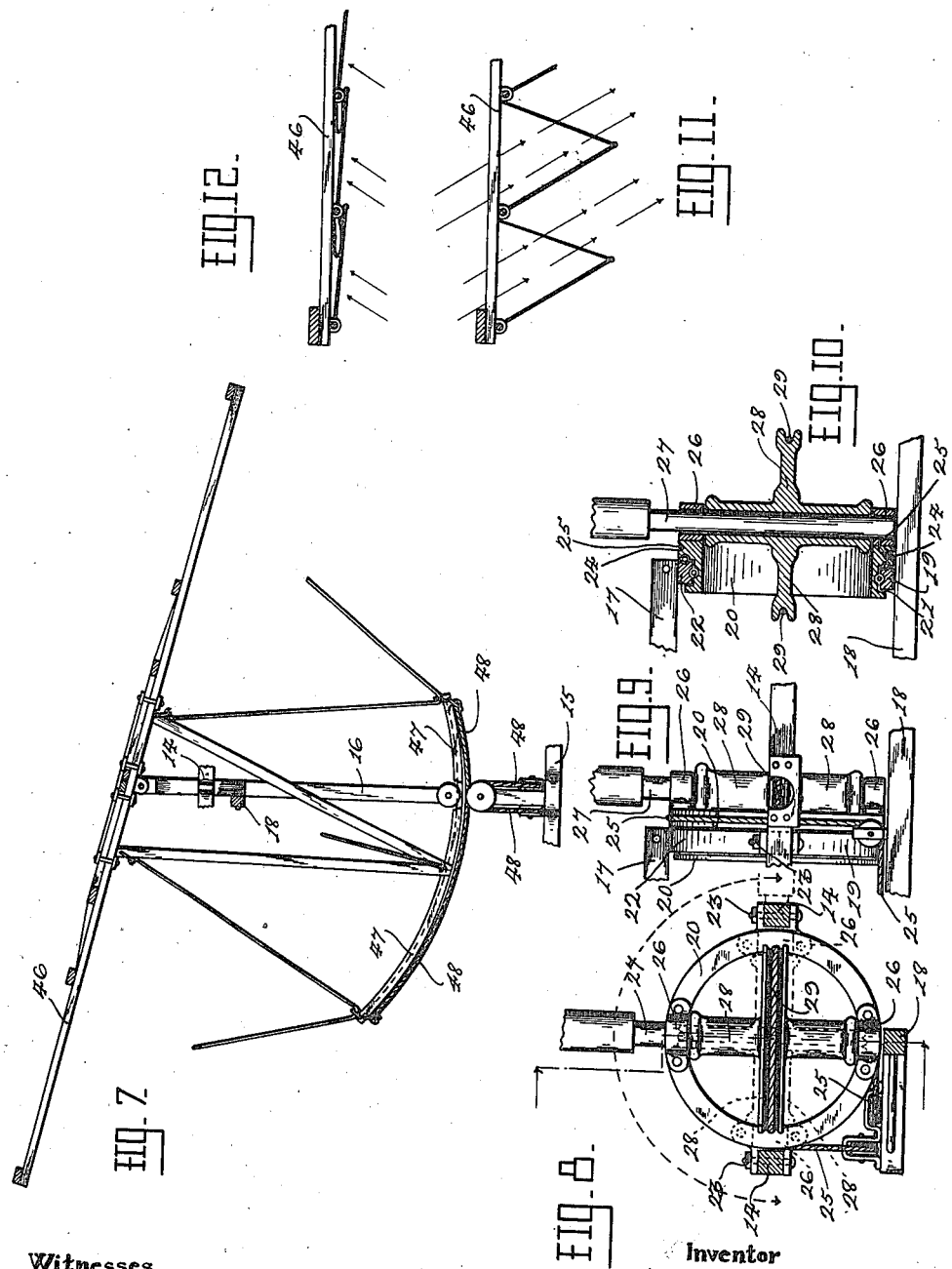

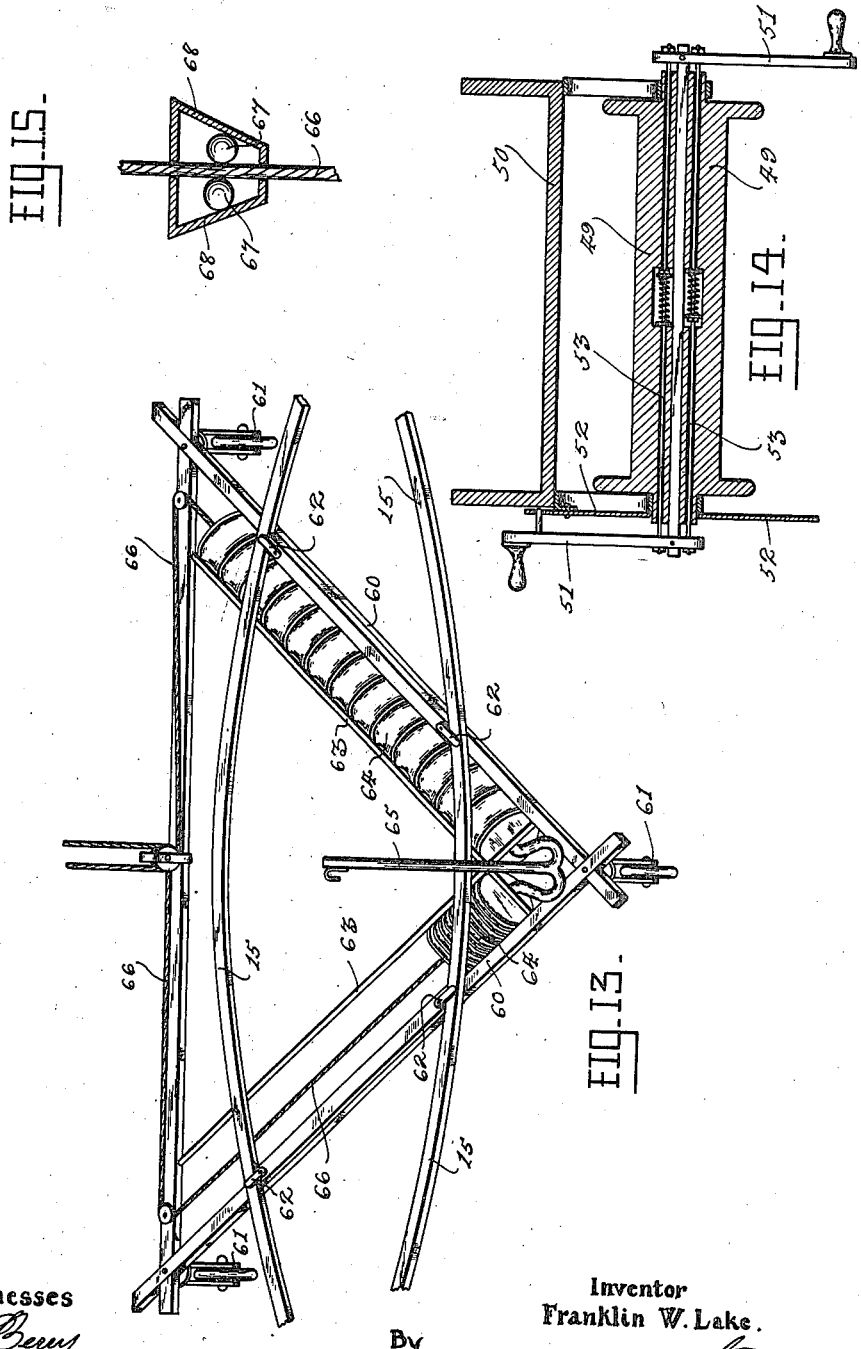

UNITED STATES PATENT OFFICE.

FRANKLIN WILLIAM LAKE, OF KINGSTON, ONTARIO, CANADA.

AEROPLANE.

1,260,917.  Specification of Letters Patent.  Patented Mar. 26, 1918.

Application filed March 19, 1917. Serial No. 155,828.

*To all whom it may concern:*

Be it known that I, FRANKLIN WILLIAM LAKE, a citizen of the Dominion of Canada, residing at Kingston, in the county of Frontenac and Province of Ontario, have invented certain new and useful Improvements in Aeroplanes, of which the following is a specification.

This invention relates to aeroplanes and has for its particular object a means whereby it can be operated to rise in a perpendicular direction without any run.

It has for a further object a means for driving the propellers whereby the propellers may be turned in a forward, perpendicular or any intermediate angle, thus having a quickly operated driving means whereby the machine may be guided by its driving power.

A further object is to provide an aeroplane which can be operated either for rising, lowering or going forward without the use of the plane.

A further object is to provide an aeroplane having a plane consisting of a net work and flaps underlying the same. The flaps being hingedly connected at one side and connected at the other side with cord, the air is permitted to pass through with very little resistance when the aeroplane is ascending, but when descending the flaps lie tight against the net work and cause considerable resistance against the air.

A further object of my invention is to provide an aeroplane having two propellers, so positioned that they can be operated in different relative positions at the same time.

With these and other objects in view, the invention consists in the construction, combination and arrangement of parts as will be hereinafter fully described, illustrated in the accompanying drawing, and pointed out in the claims hereunto appended.

Figure 1 shows a front elevation of my invention. Fig. 2 shows a rear view. Fig. 3 shows a top plan view. Fig. 4 shows a detail sectional view of the seat and operating mechanism around it. Fig. 5 is a sectional view from the rear of the seat. Fig. 6 is a detail sectional view of the assisting means for operating the propeller levers. Fig. 7 is a detail view of the operating means for the plane. Figs. 8, 9 and 10 are detail views of the propeller mounting. Figs. 11 and 12 are sectional views of the transverse flaps. Fig 13 is a perspective view of the truck and buoys attached thereto. Fig. 14 is a sectional view of the plane operating drum. Fig. 15 is a sectional view of the buoy-cable retaining means.

Referring to the drawings like numerals designate like parts in the various drawings.

The frame consists of a top and bottom frame 14 and 15 having uprights 16 connecting the same. This makes the main frame of my invention. This frame may be supported by suitable guys running between any desired points so as to strengthen the same.

17 and 18 are supplementary cross frames. 19 is a concave bearing. 20 is a guide wheel having an annular groove 21, and this guide wheel 20 is seated on the bearing 19. A further bearing 22, concave in shape, is adapted to fit over the groove 21 and the two bearings are securely held together by the bolt 23, thus journaling the guide wheel 20. This guide wheel is provided on its outer side with an annular groove 24 adapted to receive a guide rope 25, which is adapted to turn the guide wheel 20 as desired. Bearings 26 are oppositely positioned on the outer side of the guide wheel 20 and receive the inner end of the propeller shaft 27. Between the journals 26 I provide a drive wheel 28 on the shaft 27. 29 is a suitable chain, cable or rope, used for driving the propeller. This drive cable extends over pulleys 30 and down and around the main drive wheel 31. The aforementioned guide rope 25 is attached to a suitable lever 32 which is adapted to be used in turning the guide wheel 20 in turning the propeller to any desired angle. The propellers 33 are mounted at the ends of the shafts 27. It may be found that it will take considerable energy to turn the propellers from a horizontal to a perpendicular position or vice versa. Therefore, I have provided an assisting means by which I get a little power from the drive wheel 31. Mounted on the cross bar 34 I provide a bearing 35 into which is hingedly connected arms 36 having at their outer ends a transverse shaft 37 carrying a large wheel 38 at its inner end and a smaller wheel 39 at its outer end. 40 is a journal through which a shaft carries a large wheel 41 at its inner end and a pulley 42 at its outer end. Operating foot levers 43 are connected up with the arms 36 so as to pull one of the wheels 38 into connection with the side of the drive wheel 31. This action also brings the wheel 39 in contact with the wheel 41, thus transmitting at reduced speed, power to the pulley 42. 44 is a cable running around pulley 42 and the pulley 45. This cable 44 is attached to the lower end of the lever 32. There are two levers 32 and two assisting means, one at each side of the drive wheel 31 so that each propeller has its own guiding means irrespective of the other propeller. There is also a pair of foot levers for each assisting mechanism. Owing to the high speed of the drive wheel 31 the wheels 38 are so fastened that they only receive a very loose connection with the drive wheel and thus lose considerable of the speed.

From the foregoing paragraph it will be seen that by the levers 32 the propellers are operated to turn in a perpendicular, horizontal or any intermediate angle, thus giving the operator an exceedingly wide scope for quickly adjusting the course of his machine without lessening the power of the propeller. Also in making a sharp turn, have ths outside propeller pulling forward and the inside propeller pulling upward. In this way the outside propeller does the turning and the inside propeller holds the machine in a perpendicular position instead of allowing the bottom portion (where the weight is) to be swung out. These features will be found of great advantage in war operations as they give the operator a greater scope of activity than by directing the course of the aeroplane by the rudder and the plane. It is also of great advantage to the operator in starting out and landing. Also if the plane becomes broken or torn, the machine will not fall to the ground, but can be operated to fly in a horizontal direction by turning both propellers at an angle between horizontal and perpendicular.

46 is a plane having any suitable frame work and net work mounted thereon. This frame work is hingedly connected at its center to the upper ends of the upright 16 so as to be adapted to tilt its front or rear end up or down as desired. At the sides suitable braces and guides attach to a segment 47. At each end of this segment the operating rope or cable 48 is attached and they extend through pulleys up to a drum 49 under the operator's seat 50. This drum has a pair of cranks 51, one of which carries an engagement pin adapted to engage in an orifice in a plate 52 so as to stop the drum from turning when not desired. The cranks 51 are connected together by spring tensioned rods 53 so that when one crank is pulled out, to release the engagement pin, the other crank also moves. In this manner the operator controls the plane. Suitable supporting braces 54 may be positioned over the plane so as to support it against sagging.

55 is a rudder pivoted near the rear of the plane 46 at 56, the inner end of the rudder has a suitable cable 57 attached to it, which cable extends over suitable pulleys and down to a steering wheel 58. If the plane is not used the end of the rudder is pivotally connected at 59 and the cable 57 attached some distance out from this end and operated by the same steering wheel.

60 is a triangular frame being mounted on suitable casters 61. This frame has suitable cleats 62 so that when the bottom portion 15 of the main frame is properly positioned these cleats will securely hold it to the triangular moving frame. 63 is a pair of rods, one running parallel to each of the front sides of the triangular frame 60. 64 is an air tight collapsible chamber, preferably made out of canvas with annular ribs. The front ends of these chambers 64 are attached together to a flexible tube 65 which has a hook attached at its free end. At the opposite ends of the chambers 64 there are pull ropes 66, which extend over suitably positioned pulleys and extend up to the operator's box. Fig. 15 shows a holding means for the rope 66 when being pulled up. The small balls 67 in the container 68 will allow the rope to pass upward but will jam on the rope if the rope is pulled down at all. In this way the operator merely has to look after the pulling up of the rope and thus the chambers 64 are opened and fill with air so as to act as buoys in supporting the aeroplane on water.

From the foregoing it is thought that the construction of my invention will be clearly understood, and therefore a more extended explanation has been omitted.

What I claim as new, is,—

1. In an aeroplane, a framework, a plurality of propellers mounted on said framework to be turned in a vertical, horizontal or intermediate angle position, means for operating said propellers, and means operated from the main drive wheel for assisting in the turning of said propellers from a horizontal to a perpendicular position.

2. In an aeroplane, a framework, a plane tiltably mounted on the framework, a pair of propellers mounted to be turned in a vertical, horizontal or intermediate angle, means for operating said propellers, means for turning said propellers to any desired angle, and additional means operable from the main drive wheel of said propellers for turning the latter from a horizontal to a perpendicular position.

3. In an aeroplane, a framework, a pair of propellers mounted thereon and adapted to be turned into a vertical, horizontal or intermediate angle position irrespective of each other, means for turning the propellers to any desired angle, embodying a main drive wheel and means operable from said drive wheel for assisting in the turning of said propellers from a horizontal to a perpendicular position.

4. In an aeroplane, a framework, propellers mounted to be turned in a vertical, horizontal or intermediate angle position irrespective of each other, means whereby in making a sharp turn the outside propeller will pull forward and the inside propeller pull upward, and additional means operable from the main drive wheel for assisting in the turning of the propellers from a horizontal to a perpendicular position.

In testimony whereof I affix my signature in the presence of two witnesses.

FRANKLIN WILLIAM LAKE.

Witnesses:
F. MILLS,
R. CARR-HARRIS.